United States Patent
Li

(10) Patent No.: US 8,392,837 B2
(45) Date of Patent: *Mar. 5, 2013

(54) BROWSER SUPPORTING MULTIPLE USERS

(75) Inventor: Richard Ding Li, Somerville, MA (US)

(73) Assignee: Red Hat, Inc., Raleigh, NC (US)

( * ) Notice: Subject to any disclaimer, the term of this patent is extended or adjusted under 35 U.S.C. 154(b) by 717 days.

This patent is subject to a terminal disclaimer.

(21) Appl. No.: 11/713,060

(22) Filed: Feb. 28, 2007

(65) Prior Publication Data

US 2008/0209338 A1    Aug. 28, 2008

(51) Int. Cl.
*G06F 3/048* (2006.01)
*G06F 17/30* (2006.01)

(52) U.S. Cl. ........ 715/747; 715/739; 715/735; 715/745; 715/206

(58) Field of Classification Search .............. 715/739, 715/735, 745, 747, 206
See application file for complete search history.

(56) References Cited

U.S. PATENT DOCUMENTS

| | | | |
|---|---|---|---|
| 6,954,901 B1 * | 10/2005 | Desai et al. | 715/745 |
| 7,089,243 B1 * | 8/2006 | Zhang | 1/1 |
| 7,991,830 B2 | 8/2011 | Li | |
| 2003/0154398 A1 | 8/2003 | Eaton et al. | |
| 2004/0085366 A1 | 5/2004 | Foster et al. | |
| 2007/0106748 A1 * | 5/2007 | Jakobsson et al. | 709/217 |
| 2008/0209050 A1 | 8/2008 | Li | |

OTHER PUBLICATIONS

Red Hat, Inc. Office Action for U.S. Appl. No. 11/809,636 mailed Dec. 14, 2010.
Red Hat, Inc. Advisory Action for U.S. Appl. No. 11/809,636 mailed Feb. 11, 2011.
"Stainless: A multi-process browser for OS X Leopard /Snow Leopard" 1 page, © 2008-2010 MD Software, LLC, accessed Oct. 5, 2010 at http://www.stainlessapp.com.
"Stainless: Development Builds" 3 pages, accessed Oct. 5, 2010 at http://www.stainlessapp.com/doc/dev.htm.
"Stainless: Release Notes" 4 pages, accessed Oct. 5, 2010 at http://www.stainlessapp.com/doc/releasenotes.htm.
Red Hat, Inc. Office Action for U.S. Appl. No. 11/809,636 mailed Sep. 2, 2009.
Red Hat, Inc. Office Action for U.S. Appl. No. 11/809,636 mailed Mar. 5, 2010.
Red Hat, Inc. Office Action for U.S. Appl. No. 11/809,636 mailed Jul. 12, 2010.
USPTO Notice of Allowance for U.S. Appl. No. 11/809,636 mailed Mar. 22, 2011.

* cited by examiner

*Primary Examiner* — Namitha Pillai
(74) *Attorney, Agent, or Firm* — Lowenstein Sandler LLP

(57) ABSTRACT

A method and apparatus for a browser supporting multiple user identifying states. A plurality of browser instances are initiated on a client. One of a plurality of user identifying states is selected for each of the plurality of browser instances. Each selected user identifying state is used in a distinct session between the browser and a server.

19 Claims, 4 Drawing Sheets

BROWSER SUPPORTING MULTIPLE USERS

TECHNICAL FIELD

Embodiments of the present invention relate to browsers, and more specifically to web browsers in which multiple user identifying states can be employed, and in which multiple user profiles can be employed.

BACKGROUND

Web browsers are an integral part of the internet. Web browsers access information from web servers, and present the information to users in a convenient, easily understood manner.

How a web browser interacts with, and receives data from, web servers depends upon a number of parameters. A first type of parameters may be user selectable from a preferences or options menu of the web browser. These parameters include security preferences, javascript preferences, popup blocking preferences, web viewing preferences, and so on. For each of these parameters, a user can select a specific option (e.g., enable, disable, etc.).

A second type of parameters is a set of data structures that define a user identifying state. Examples of such data structures include a browser history, a browser cache, one or more cookies, etc.

BRIEF DESCRIPTION OF THE DRAWINGS

The present invention is illustrated by way of example, and not by way of limitation, in the figures of the accompanying drawings and in which.

DETAILED DESCRIPTION

Figure 1:
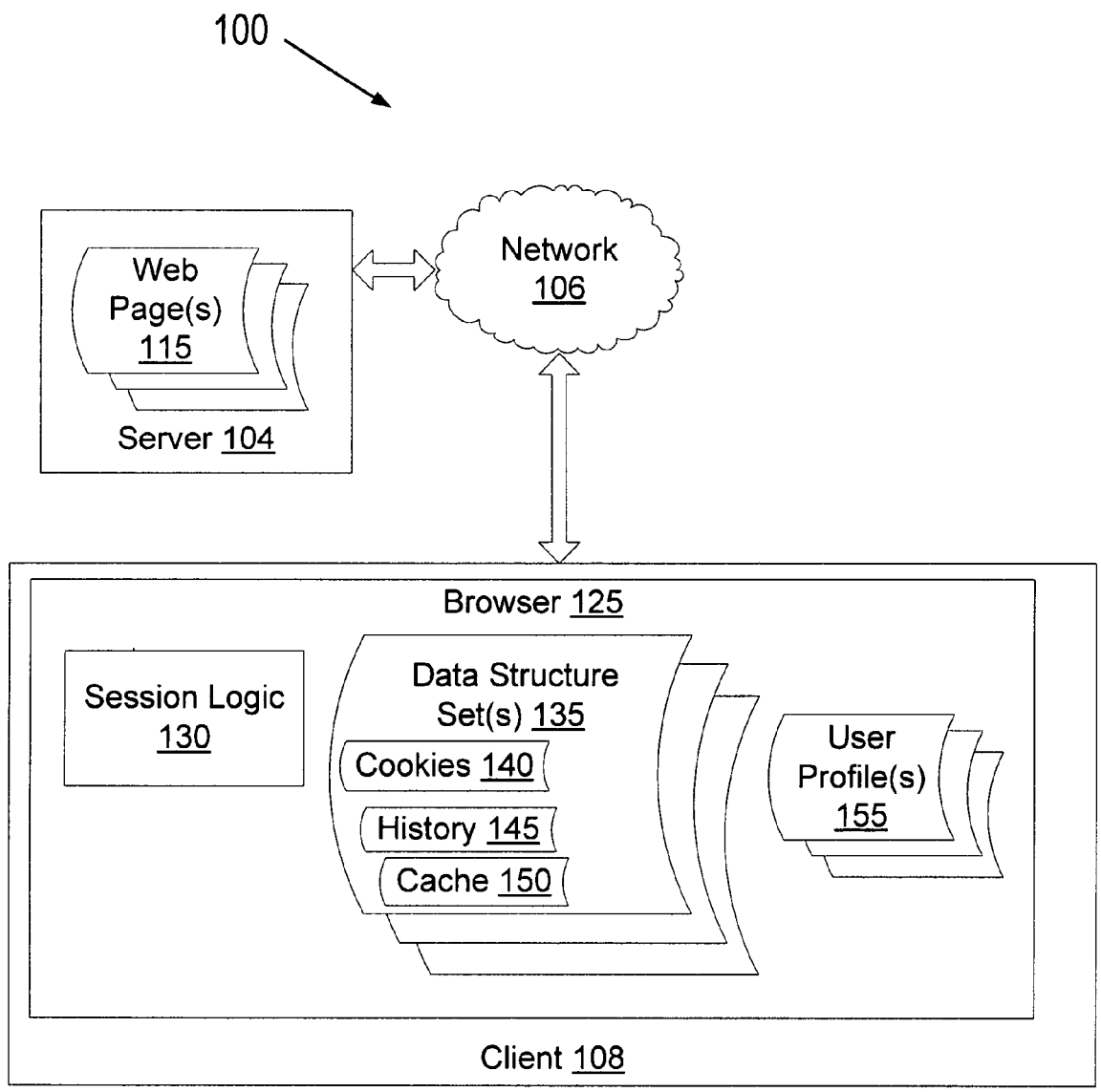
FIG. 1 illustrates an exemplary network architecture, in which embodiments of the present invention may operate.

Described herein is a method and apparatus for a browser supporting multiple user identifying states. In one embodiment, multiple browser instances are initiated on a client. In response, a distinct user identifying state is selected for each of the browser instances, and is used in a distinct session between the browser instance and a server. Each of the user identifying states may be contained within a set of data structures. In addition, in one embodiment, a specific user profile is selected for each browser instance, and is used in the distinct session between the browser instance and the server. As a result, users may have different personas on their machines to protect their privacy, or a programmer can emulate two different users when debugging or developing a web application.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

FIG. 1 illustrates an exemplary network architecture 100, in which embodiments of the present invention may operate. The network architecture 100 may include a client device (client) 108, a server 104 and a network 106. The client 108 and the server 104 are coupled to the network 106, which may be a public network (e.g., Internet) or a private network (e.g., Ethernet or a local area Network (LAN)).

In one embodiment, the server 104 is a web server that provides content such as text, images and other information in the form of web pages 115. The server 104 may accept requests (e.g., HTTP requests) from client 108, and respond by sending responses (e.g., HTTP responses), which may include web pages 115.

The client 108 may be, for example, a personal computer (PC), mobile phone, palm-sized computing device, personal digital assistant (PDA), etc. The client 108 may include a browser 125. The browser 125 is an application that enables the client 108 to display and interact with text, images, and other information provided by the server 104. The browser 125 may be a web browser configured to display web pages 115.

The browser may communicate with the server 104 to receive web pages 115 (e.g., by using hypertext transfer protocol (HTTP)). The browser 125 allows a user to navigate between web pages 115 by traversing hyperlinks that connect such web pages 115. The browser 125 may include an ability to view and/or manipulate HTML documents, image formats (e.g., JPEG, PNG, GIF, etc.), and additional information. The browser 125 may also support usenet news, internet relay chat (IRC), email, etc. Protocols supported may include network news transfer protocol (NNTP), simple mail transfer protocol (SMTP), internet message access protocol (IMAP), and post office protocol (POP).

The browser 125 presents data for display based on user identifying state. User identifying state includes information collected by a browser during a user's online activity. User identifying state is contained in a set of data structures that may include, for example, cookies, browser cache, browser history, or any combination of the above. Embodiments of the present invention allow the browser 125 to support different user identifying states. These different user identifying states may be used concurrently with separate browser instances, or consecutively.

In one embodiment, the browser 125 maintains multiple data structure sets 135. In one embodiment, each of the data structure sets 135 is an array of data that contains a user identifying state. Alternatively, each of the data structure sets 135 may be a collection of data in any format. The collection of data may include one or more cookies 140 (data received from a server, and sent back to the server each time it is accessed), a browser history 145 (log of viewed web pages) and a browser cache 150 (images, text, and other web page content cached on the client). Data structure sets 135 may also include additional data such as, for example, bookmarks, stored passwords, stored auto-complete form information, address bar history, etc.

Each of the data structure sets 135 may include data components (e.g., cookies, browser history, browser cache, etc.) whose values are unique to that data structure set. Alternatively, one or more data components may be shared between different data structure sets 135. The data components within a data structure set may affect the presentation and/or functionality of web pages 115 when they are rendered by the browser 125. Therefore, a web page may appear differently for each data structure set, and thus each user identifying state. For example, a single web page may be displayed differently based on two different user identifying states.

Different user identifying states allow a user to have multiple identities when using the same browser 125. That is, server 104 may perceive the user of client 108 as user A when the browser 125 sends a request for content using a first user identifying state. For example, the browser 125 may send a request using a first data structure set having a first cookie. Subsequently, the browser 125 may send another request to the server 104 using a different data structure set which does not include the first cookie. As a result, the server 104 will no longer link this other request to user A but will rather associate it with user B. Hence, when the browser 125 uses different user identifying states to request content from a content provider, the content provider associates these requests with two different users. As a result, users may have different personas on their machines to protect their privacy, or a programmer can emulate two different users when debugging the operation of a website or a web application.

In one embodiment, the browser 125 maintains multiple user profiles 155. Each of the user profiles 155 is defined by a unique set of user preferences. User preferences may include all user customizable browser settings, such as those provided in the "Internet Options" menu of the Internet Explorer® web browser and the "Options" menu of the Mozilla Firefox® web browser. For example, user preferences may include webpage viewing preferences, formatting preferences, print preferences, layout preferences, security preferences, popup window blocking preferences, feature enablement preferences, language enablement preferences, etc.

User preferences may affect (at least partially) how web pages 115 and other content are presented by the browser 125. For example, a first user profile may include a user preference disabling javascript, and a second user profile may include a user preference enabling javascript. Web pages 115 may then be presented with javascript features when the browser 125 accesses the server 104 using the second user profile, and may be presented without javascript features when the browser 125 accesses the server 104 using the first user profile.

In one embodiment, the browser 125 maintains a separate data structure set and user profile for each user identity. Accordingly, separate user preferences, browser history, browser cache, etc., may be maintained by the browser 125 for each user identity. In one embodiment, the browser cache 150 is shared between data structure sets 135 so as to optimize performance (e.g., by increasing the web cache size available to each data structure set).

In one embodiment, the browser 125 includes a session logic 130 that supports the use of different user identifying states and/or user profiles with different browser instances. In particular, for each browser instance, the session logic 130 may select one of the data structure sets 135 and/or one of the user profiles 155 and use them in a session for this browser instance. The session may be a lasting connection between the client 108 and the server 104, or an intermittent connection whose state is stored at one or both of the client 108 and the server 104.

In one embodiment, the session logic 130 selects a data structure set and/or a user profile automatically. For example, the browser 125 may be configured to use a first data structure set and/or a first user profile when a first website is accessed, and a second data structure set and/or second user profile when a second website is accessed. Web pages 115 may be categorized into different groups, and a different data structure set and user profile may be used for each group. Examples of web pages that may be combined to form groups include search sites, shopping sites, news sites, etc. Therefore, a first user profile and first user identifying state may automatically apply when search sites are visited, and a second user profile and user identifying state may automatically apply when shopping sites are visited.

In another embodiment, the session logic 130 selects a data structure set and/or a user profile based on user input. A user may be prompted by the session logic 130 to select one or more data structure sets and user profiles when a new session is initiated. The browser 125 may also include a default data structure set and a default user profile that are associated with new sessions unless the user indicates that a different data structure set or user profile are to be used.

The session logic 130 may maintain different sessions simultaneously using browser tabs or browser windows. In one embodiment, the selected data structure set determines how the content is presented by the browser. Alternatively, the selected user profile determines how the content is presented by the browser. In yet another embodiment, both the selected data structure set and the selected user profile determine how the session is presented in the browser instance.

In one embodiment, the session logic 130 provides a unique visual indication for content presentation pertaining to each session based on a selected user identifying state and/or a selected user profile. The unique visual indication may include one or more of a unique color, label, text, and icon. This may enable a user to easily identify which user identifying state and which user profile is associated with each session.

The session logic 130 may generate new user profiles and new user identifying states, and delete existing user profiles and existing user identifying states. In one embodiment, new user profiles and new user identifying states are generated automatically when certain criteria are satisfied. For example, the session logic 130 may be configured to generate a new user profile when a web page is visited for the first time. Alternatively, new user profiles and new user identifying states may be generated upon user request. Once created, new user profiles and new user identifying states may be associated with a session.

In one embodiment, the above described features are natively present in the browser 125. In alternative embodiments, one or more of the above features are implemented in the browser 125 by adding one or more plugins and/or extensions.

Figure 2:
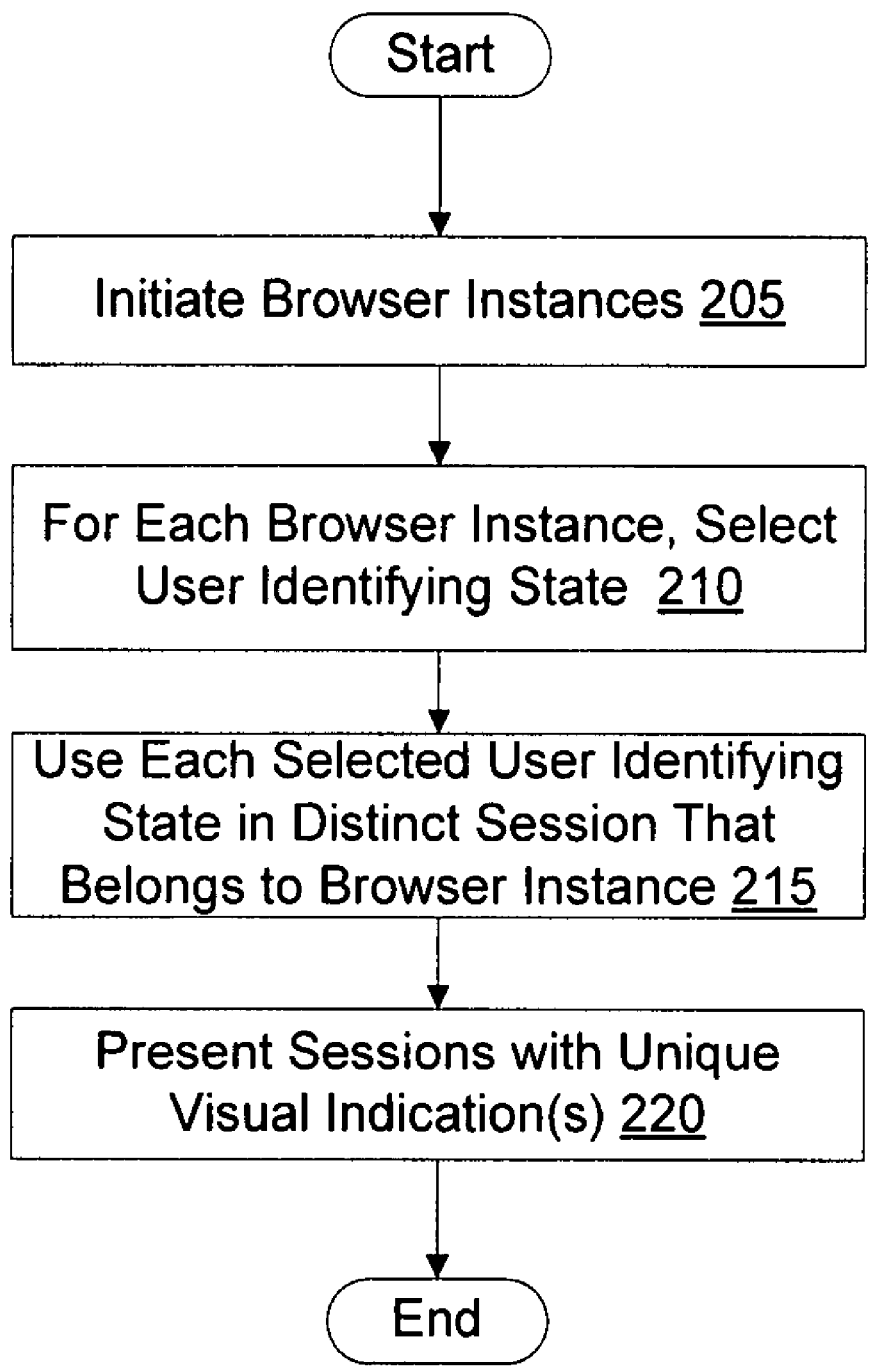
FIG. 2 illustrates a flow diagram of one embodiment for a method of web browsing.

FIG. 2 illustrates a flow diagram of one embodiment for a method 200 of web browsing. The method may be performed by processing logic that may comprise hardware (e.g., circuitry, dedicated logic, programmable logic, microcode, etc.), software (such as instructions run on a processing device), or a combination thereof. In one embodiment, method 200 is performed by the browser 125 of FIG. 1.

Referring to FIG. 2, method 200 begins with processing logic initiating multiple browser instances of a browser (block 205). The browser instances may include a first browser instance initiated when the browser is started, and/or subsequent browser instances initiated automatically or based on a user request.

At block 210, for each browser instance, one of multiple user identifying states is selected. The user identifying state may be selected automatically or based on user input. In one embodiment, each user identifying state is defined by a unique set of data structures that may include at least one of a browser history, a browser cache, and one or more cookies.

Existing user identifying states may be selected. Alternatively, a new user identifying state may be created. The new user identifying state may include default user identifying information or information entered by the user.

At block 215, each selected user identifying state is used in a distinct session. In one embodiment, each of the distinct sessions is a session between a client and a first server. Alternatively, some sessions may be between the client and the first server, while other sessions may be between the client and other servers. At block 220, contents associated with the sessions are presented in separate browser instances (e.g., browser tabs or browser windows). Selected user identifying states may determine how contents associated with sessions are presented in the browser instances. In one embodiment, content associated with a session is presented with one or more unique visual indications based on the selected user identifying state. The unique visual indications may include one or more of a unique color, label, text and icon.

Figure 3:
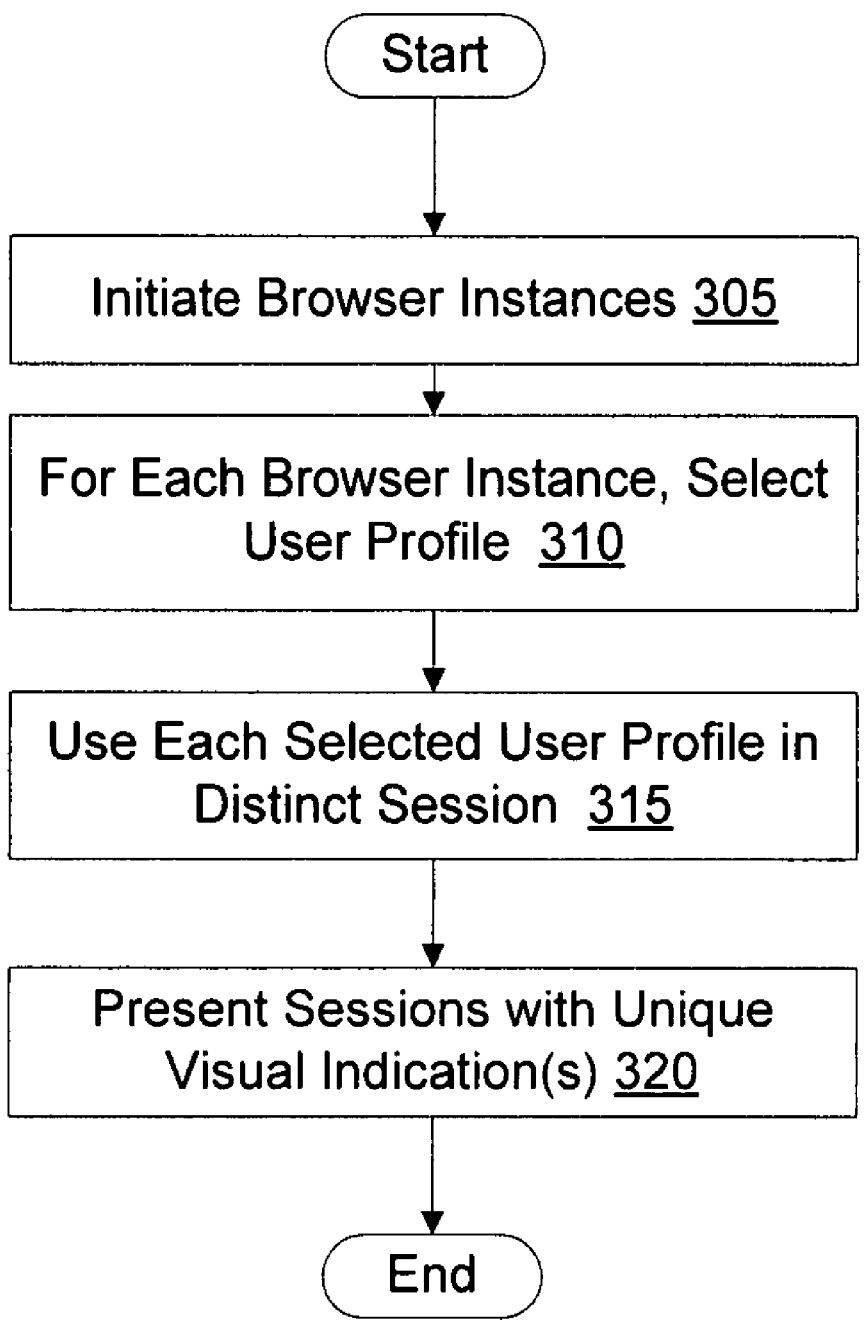
FIG. 3 illustrates a flow diagram of another embodiment for a method of web browsing.

FIG. 3 illustrates a flow diagram of one embodiment for a method 300 of web browsing. The method may be performed by processing logic that may comprise hardware (e.g., circuitry, dedicated logic, programmable logic, microcode, etc.), software (such as instructions run on a processing device), or a combination thereof. In one embodiment, method 300 is performed by the browser 125 of FIG. 1.

Referring to FIG. 3, method 300 begins with processing logic initiating multiple browser instances of a browser (block 305). The browser instances may include a first browser instance initiated when the browser is started and/or subsequent browser instances initiated automatically or based on a user request.

At block 310, for each browser instance, one of multiple user profiles is selected. Each of the plurality of user profiles is defined by a unique set of user preferences. In one embodiment, user preferences include at least one of a viewing preference, a formatting preference, a print preference, a layout preference, a security preference, a popup window blocking preference, a feature enablement preference, and a language enablement preference (e.g., javascript).

Existing user profiles may be selected, or new user profiles may be created. In one embodiment, a created user profile has default preferences. Alternatively, the user may manually set user preferences for the user profile to be created.

At block 315, each selected user profile is used in a distinct session. At block 320, content associated with each session is presented in a browser instance, which may be a browser tab or a browser window. The selected user profiles may determine how the contents associated with the sessions are presented in the browser instances. In one embodiment, one or more unique visual indications are provided for each session based on the selected user profile. The unique visual indications may include one or more of a unique color, label, text and icon.

Figure 4:
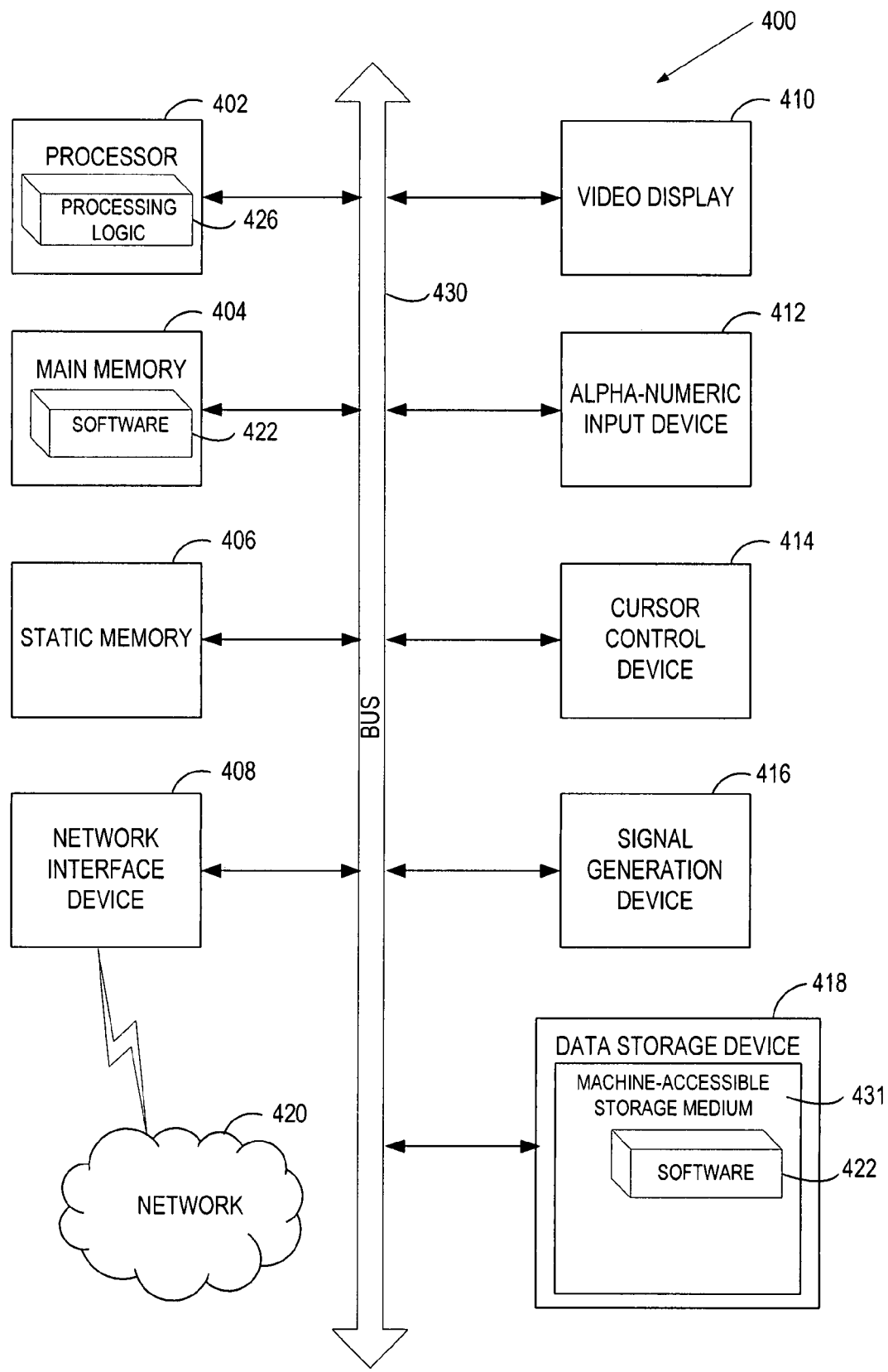
FIG. 4 illustrates a block diagram of an exemplary computer system, in accordance with one embodiment of the present invention.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device (processor) 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 431 on which is stored one or more sets of instructions (e.g., software 422) embodying any one or more of the methodologies or functions described herein. The software 422 may also reside, completely or at least partially, within the main memory 404 and/or within the processor 402 during execution thereof by the computer system 400, the main memory 404 and the processor 402 also constituting machine-accessible storage media. The software 422 may further be transmitted or received over a network 420 via the network interface device 408.

The machine-accessible storage medium 431 may also be used to store data structure sets that define user identifying states and user preferences that define user profiles. Data structure sets and user profiles may also be stored in other sections of computer system 400, such as static memory 406.

While the machine-accessible storage medium 431 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any physical medium that is capable of storing, encoding or carrying a set of instructions for execution by the machine and that cause the machine to perform any one or more methodologies of the present invention. The term "machine-accessible storage medium" shall accordingly be taken to include, but not be limited to, solid-state memories and optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer implemented method, comprising:
   initiating, by a client machine executing a browser, a first browser instance of the browser;
   receiving first user input selecting a first user identifying state for the first browser instance, wherein the first user identifying state is associated with a first user;
   selecting the first user identifying state by the client machine for the first browser instance based on the first user input, prior to accessing any web pages by the first browser instance, wherein the first user identifying state is associated with a first data structure set that includes two or more of a first browser history, a first browser cache or a first cookie that are stored at the client machine;
   updating one or more of the first browser history, the first browser cache or the first cookie of the first data structure set based on a first session between the first browser instance and a first server without updating a second data structure set associated with a second user identifying state, wherein the second data structure set includes two or more of a second browser history, a second browser cache or a second cookie;
   initiating, by the client machine, a second browser instance of the browser while the first browser instance is open;
   receiving second user input selecting the second user identifying state for the second browser instance, wherein the second user identifying state is associated with a second user;
   selecting the second user identifying state by the client machine for the second browser instance based on the second user input, prior to accessing any web pages by the second browser instance; and
   updating one or more of the second browser history, the second browser cache or the second cookie of the second data structure set based on a second session between the second browser instance and one of the first server or a second server without updating the first data structure set.

2. The method of claim 1, wherein each of the browser instances is one of a browser tab or a browser window, the method further comprising:
   presenting in the first browser instance content pertaining to the first session based on the first user identifying state; and
   presenting in the second browser instance content pertaining to the second session based on the second user identifying state.

3. The method of claim 2, wherein the first user identifying state determines how the content pertaining to the first session is presented and the second user identifying state determines how the content pertaining to the second session is presented.

4. The method of claim 2, further comprising:
   providing a first unique visual indication for the first browser instance based on the first user identifying state and providing a second unique visual indication for the second browser instance based on the second user identifying state.

5. The method of claim 4, wherein the first unique visual indication and the second unique visual indication each include at least one of a unique color, label, text or icon.

6. The method of claim 1, further comprising:
   selecting a first user profile for the first browser instance, the first user profile being defined by a first set of user preferences;

selecting a second user profile for the second browser instance, the second user profile being defined by a second set of user preferences;
using the first user profile in the first session; and
using the second user profile in the second session.

7. The method of claim 6, further comprising:
creating at least one of the first user profile or the second user profile based on user input.

8. The method of claim 6, wherein each of the first user profile and the second user profile include at least one of a webpage viewing preference, a formatting preference, a print preference, a layout preference, a security preference, a popup window blocking preference, a feature enablement preference, or a language enablement preference.

9. The method of claim 1, further comprising:
performing at least one of creating a user identifying state or deleting a user identifying state.

10. The method of claim 1, further comprising:
requesting selection of the first user identifying state for the first browser instance by the client machine upon initiating the first browser instance; and
requesting selection of the second user identifying state for the second browser instance by the client machine upon initiating the second browser instance.

11. A non-transitory machine-accessible storage medium including data that, when accessed by a client machine, cause the client machine to perform a method comprising:
initiating, by the client machine executing a browser, a first browser instance of the browser;
receiving first user input selecting a first user identifying state for the first browser instance, wherein the first user identifying state is associated with a first user;
selecting the first user identifying state by the client machine for the first browser instance based on the first user input, prior to accessing any web pages by the first browser instance, wherein the first user identifying state is associated with a first data structure set that includes two or more of a first browser history, a first browser cache or a first cookie that are stored at the client machine;
updating one or more of the first browser history, the first browser cache or the first cookie of the first data structure set based on a first session between the first browser instance and a first server without updating a second data structure set associated with a second user identifying state, wherein the second data structure set includes two or more of a second browser history, a second browser cache or a second cookie;
initiating, by the client machine, a second browser instance of the browser while the first browser instance is open;
receiving second user input selecting the second user identifying state for the second browser instance, wherein the second user identifying state is associated with a second user;
selecting the second user identifying state by the client machine for the second browser instance based on the second user input, prior to accessing any web pages by the second browser instance; and
updating one or more of the second browser history, the second browser cache or the second cookie of the second data structure set based on a second session between the second browser instance and one of the first server or a second server without updating the first data structure set.

12. The non-transitory machine-accessible storage medium of claim 11, wherein each of the browser instances is one of a browser tab or a browser window, the method further comprising:
presenting in the first browser instance content pertaining to the first session based on the first user identifying state; and
presenting in the second browser instance content pertaining to the second session based on the second user identifying state.

13. The non-transitory machine-accessible storage medium of claim 12, wherein the method further comprises:
providing a first unique visual indication for the first browser instance based on the first user identifying state and providing a second unique visual indication for the second browser instance based on the second user identifying state, the first unique visual indication and the second unique visual indication including at least one of a unique color, label, text or icon.

14. The non-transitory machine-accessible storage medium of claim 11, wherein the method further comprises:
selecting a first user profile for the first browser instance, the first user profile being defined by a first set of user preferences;
selecting a second user profile for the second browser instance, the second user profile being defined by a second set of user preferences;
using the first user profile in the first session; and
using the second user profile in the second session.

15. The machine-accessible storage medium of claim 11, the method further comprising:
requesting selection of the first user identifying state for the first browser instance upon initiating the first browser instance; and
requesting selection of the second user identifying state for the second browser instance upon initiating the second browser instance.

16. A client machine comprising:
a memory to store instructions for a browser; and
a processing device, connected with the memory, to execute the instructions, wherein the instructions cause the processing device to:
initiate a first browser instance of the browser;
select a first data structure set from a plurality of data structure sets for a first user based on first user input, wherein the first data structure set is selected prior to initiating a first session between the client machine and a first server, and wherein the first data structure set includes two or more of a first browser history, a first browser cache or a first cookie;
update one or more of the first browser history, the first browser cache or the first cookie of the first data structure set based on the first session without updating a second data structure set of the plurality of data structure sets that is associated with a second user identifying state, wherein the second data structure set includes two or more of a second browser history, a second browser cache or a second cookie;
initiate a second browser instance of the browser while the first browser instance is open;
select a second data structure set from the plurality of data structure sets for a second user based on second user input, wherein the second data structure set of the plurality of data structure sets is selected prior to initiating a second session between the client machine and one of the first server and a second server; and update one or more of the second browser history, the second browser cache or the second cookie of the second data structure set based on the second session without updating the first data structure set.

17. The client machine of claim 16, further comprising the instructions to cause the processing device to present the first session and the second session in separate browser instances, the first selected data structure set determining how content pertaining to the first session is presented in a first browser instance, and the second selected data structure set determining how content pertaining to the second session is presented in a second browser instance.

18. The client machine of claim 16, further comprising:
a data store having a plurality of user profiles, each of the plurality of user profiles being defined by a set of user preferences, wherein the instructions further cause the processing device to select a first one of the plurality of user profiles to use in the first session, and to select a second one of the plurality of user profiles to use in the second session.

19. The client machine of claim 16, wherein the processing device is further configured to:
request selection of the first user identifying state for the first browser instance upon initiating the first browser instance; and
request selection of the second user identifying state for the second browser instance upon initiating the second browser instance.

\* \* \* \* \*